United States Patent
Lee et al.

(10) Patent No.: US 9,438,723 B2
(45) Date of Patent: Sep. 6, 2016

(54) PROVIDING VARIOUS FUNCTIONS TO A MOBILE DEVICE USING A COVER HAVING AN OPENING FORMED THEREIN

(71) Applicant: LG ELECTRONICS INC., Seoul (KR)

(72) Inventors: Sunah Lee, Seoul (KR); Kyungjin Moon, Seoul (KR); Songyi Baek, Seoul (KR); Sehyun Jung, Seoul (KR); Yoonseok Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/610,708

(22) Filed: Jan. 30, 2015

(65) Prior Publication Data

US 2015/0222743 A1      Aug. 6, 2015

(30) Foreign Application Priority Data

Feb. 3, 2014   (KR) .......................... 10-2014-0012041

(51) Int. Cl.
*H04B 1/38*      (2015.01)
*H04M 1/725*    (2006.01)
(Continued)

(52) U.S. Cl.
CPC ............ *H04M 1/72577* (2013.01); *G06F 3/01* (2013.01); *G06F 3/02* (2013.01); *H04M 1/72575* (2013.01); *H04M 1/0245* (2013.01)

(58) Field of Classification Search
CPC ............. G06F 3/04883; G06F 1/1626; G06F 1/1677; G06F 2200/1634; G06F 3/04886; G06F 3/048; G06F 2200/1633; G06F 2203/04803; G06F 3/041; G06F 3/04817; G06F 1/1628; G06F 1/165; H04M 1/0245; H04M 1/04; H04M 1/0266; H04M 1/185; H04M 1/72575; H04M 2250/22; H04M 1/0214; H04M 1/0272; H04M 1/236; H04M 1/67; H04M 1/7253; H04M 1/72555; H04M 1/72577; H04M 2250/12; H04M 3/567
See application file for complete search history.

(56) References Cited

U.S. PATENT DOCUMENTS

2001/0012769 A1     8/2001   Sirola et al.
2012/0302167 A1*   11/2012   Yun ................... G06F 3/04883
                                                                        455/41.2
2013/0290866 A1*   10/2013   Kim .................. H04M 1/72555
                                                                        715/748

(Continued)

FOREIGN PATENT DOCUMENTS

EP    1226699   7/2002
GB    2355146   4/2001

(Continued)

OTHER PUBLICATIONS

European Patent Office Application Serial No. 15152115.0, Search Report dated Jun. 10, 2015, 6 pages.

*Primary Examiner* — Golam Sorowar
(74) *Attorney, Agent, or Firm* — Lee, Hong, Degerman, Kang & Waimey; Jonathan Kang; Harry Lee

(57) ABSTRACT

A mobile terminal and controlling method thereof are disclosed, by which various functions can be provided using a cover having an opening formed therein. The present invention includes a cover having an opening formed therein, a touchscreen, a sensing unit configured to detect whether the cover is open or closed, and a controller, if a memo mode is executed when detecting that the cover is in a closed state through the sensing unit, receiving an input of a memo applied with a pointer to an exposed region of the touchscreen exposed through the opening, the controller, if detecting that that the cover is open through the sensing unit, controlling the inputted memo to be displayed on the touchscreen.

21 Claims, 15 Drawing Sheets

(51) Int. Cl.
*G06F 3/01* (2006.01)
*G06F 3/02* (2006.01)
*H04M 1/02* (2006.01)

(56) References Cited

U.S. PATENT DOCUMENTS

2013/0298073 A1* 11/2013 Kim .................. G06F 3/04886
715/780

2015/0062097 A1* 3/2015 Chung .................. G06F 1/1626
345/184
2015/0065207 A1* 3/2015 Hong .................. H04M 1/0245
455/575.3

FOREIGN PATENT DOCUMENTS

| JP | 2006-277739 | 10/2006 |
| KR | 10-1187187 | 10/2012 |
| KR | 10-2013-0004769 | 1/2013 |

* cited by examiner

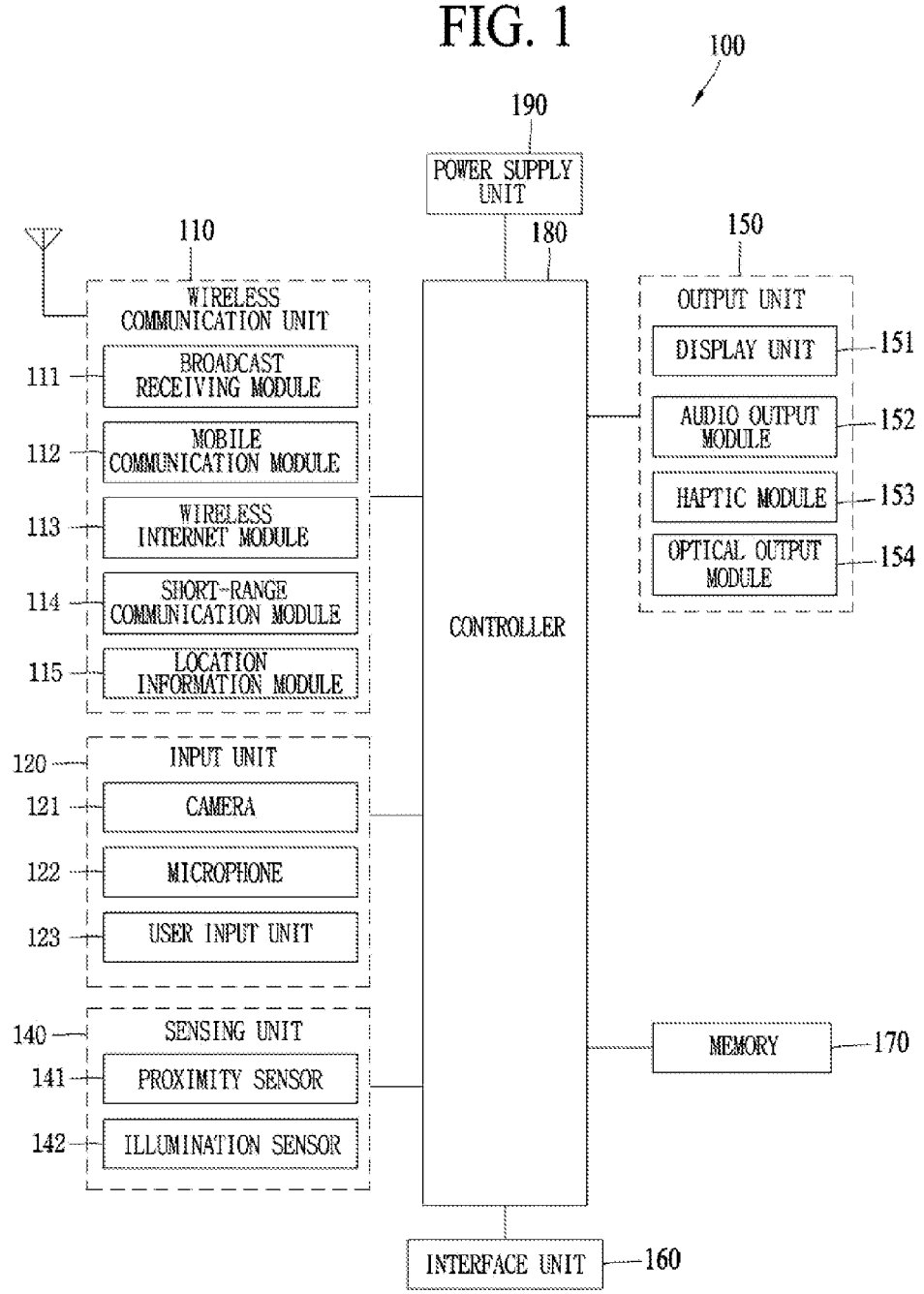

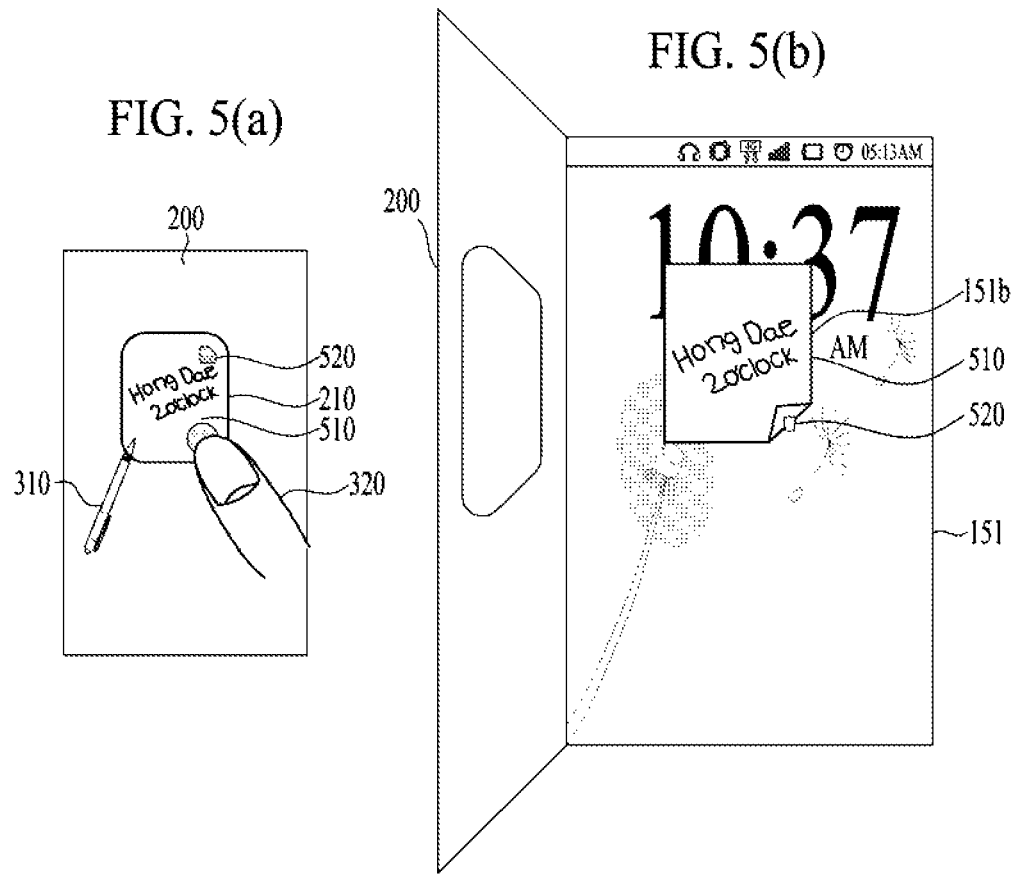

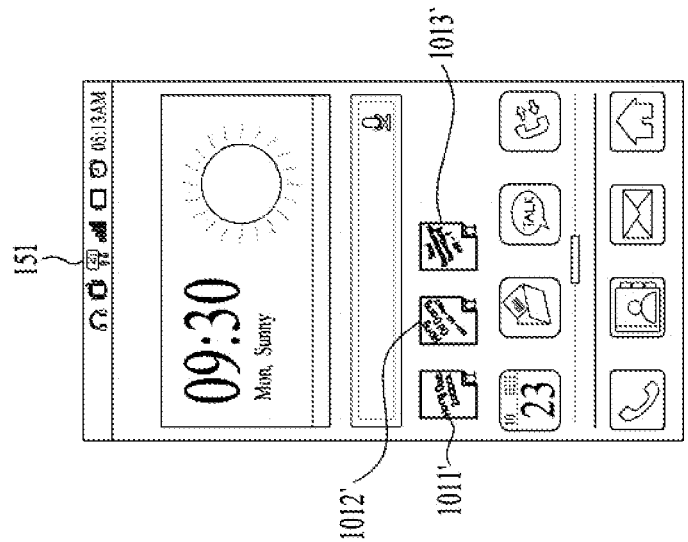
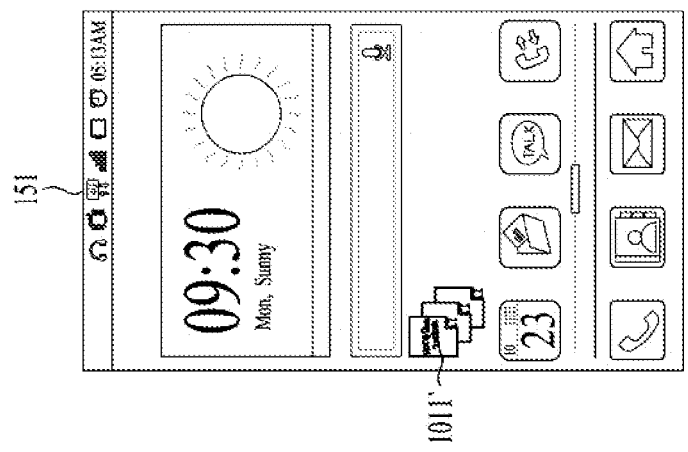
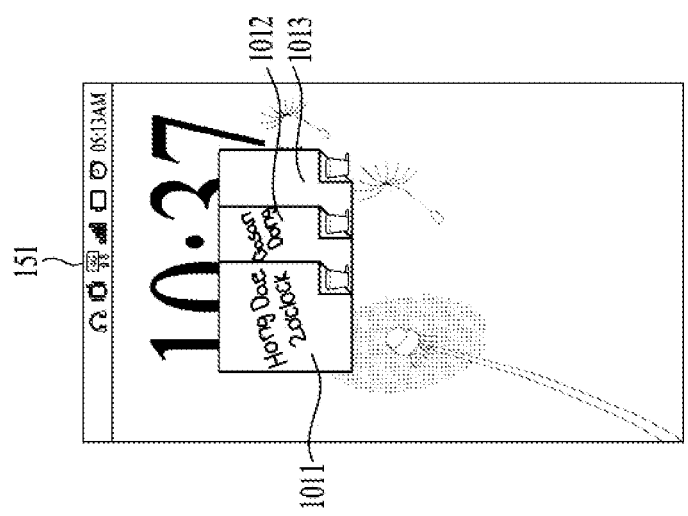

PROVIDING VARIOUS FUNCTIONS TO A MOBILE DEVICE USING A COVER HAVING AN OPENING FORMED THEREIN

Pursuant to 35 U.S.C. §119(a), this application claims the benefit of earlier filing date and right of priority to Korean Patent Application No. 10-2014-0012041, filed on Feb. 3, 2014, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing various functions using a cover having an opening formed therein.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal Recently, covers in various configurations are applied to mobile terminals such as smartphones and the like. Each of the covers plays a role in protecting a body of the mobile terminal from external shock or scratch and helps the mobile terminal to perform various functions owing to a shape and configuration of the corresponding cover. However, since such function is limited to activation/deactivation of a touchscreen in response to an action of opening/closing a cover only, the demand for more convenient functions is increasingly rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a memo can be conveniently composed in response to an action of opening/closing a cover having an opening when the cover is attached to the mobile terminal Another object of the present invention is to provide a mobile terminal and controlling method thereof, by which various additional functions can be provided using a composed memo.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a cover having an opening formed therein, a touchscreen, a sensing unit configured to detect whether the cover is open or closed, and a controller, if a memo mode is executed when detecting that the cover is in a closed state through the sensing unit, receiving an input of a memo applied with a pointer to an exposed region of the touchscreen exposed through the opening, the controller, if detecting that that the cover is open through the sensing unit, controlling the inputted memo to be displayed on the touchscreen.

In another aspect of the present invention, as embodied and broadly described herein, a method of controlling a mobile terminal according to one embodiment of the present invention may include the steps of detecting whether a cover having an opening formed therein is open or closed through a sensing unit, executing a memo mode when detecting that the cover is in a closed state, receiving an input of a memo applied with a pointer to an exposed region of a touchscreen exposed through the opening, and if detecting that that the cover is open through the sensing unit, displaying the inputted memo on the touchscreen.

In further aspect of the present invention, as embodied and broadly described herein, a mobile terminal according to one embodiment of the present invention may include a cover having an opening formed therein, a touchscreen, a sensing unit configured to detect whether the cover is open or closed, and a controller, if a memo mode execute command is inputted when detecting that the cover is in a closed state through the sensing unit, receiving an input of a memo applied with a pointer to an exposed region of the touchscreen exposed through the opening, the controller, saving the inputted memo in association with an information displayed on the exposed region when the memo mode execute command is inputted, the controller, if detecting that that the cover is open through the sensing unit, controlling the inputted memo to be displayed on the touchscreen.

Accordingly, the present invention provides the following effects and/or features.

First of all, a memo composition can be further facilitated in closed state of a cover.

Secondly, a content of a composed memo is conveniently linked to other functions or can be shared externally.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to one embodiment of the present invention;

FIG. 5(a) and FIG. 5(b) are diagrams for one example of a process for composing and displaying a memo in a mobile terminal according to one embodiment of the present invention;

FIG. 10(a), FIG. 10(b) and FIG. 10(c) are diagrams for another example of a process for performing an additional function using a composed memo in a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 2A:
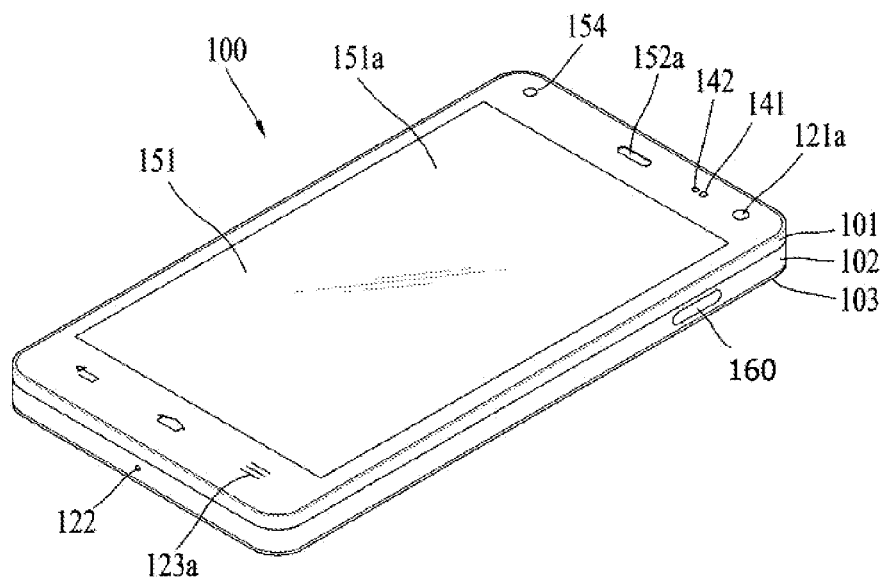
FIG. 2(a) and FIG. 2(b) are perspective diagrams for one example of a mobile terminal according to one embodiment of the present invention in different view directions.
Figure 2B:
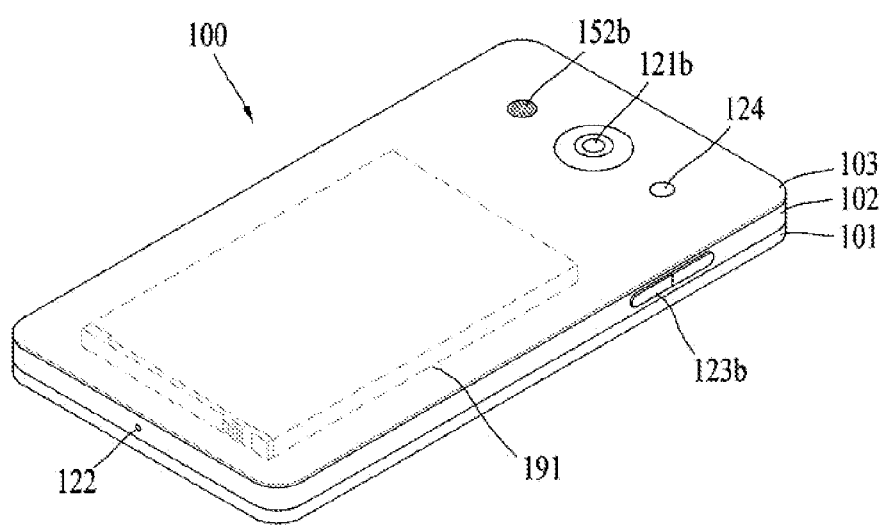

Reference is now made to FIGS. 1-2B, where FIG. 1 is a block diagram of a mobile terminal in accordance with the present disclosure, and FIGS. 2A and 2B are conceptual views of one example of the mobile terminal, viewed from different directions.

According to the present invention, various functions are provided through linked operations between a mobile terminal and a wearable device. Therefore, a configuration of a watch type wearable device is described as one example of a wearable device to which the present invention is applicable.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1-2B according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

Besides, a hole sensor can be provided. In this case, the hole sensor is a sensor for sensing a change of a magnetic field. The hole sensor can detect a proximate presence or non-presence of a magnet. Hence, in case that a cover is provided with a magnet, the controller 180 can determine whether the cover is located proximately, i.e., whether the cover is open or closed, through the hole sensor.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2(a) illustrates the first manipulation unit 123a as a touch key, but possible alternatives include a mechanical key, a push key, a touch key, and combinations thereof Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 12 lb can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 2(b), a flash 124 is shown adjacent to the second camera 121b. When an image of a subject is captured with the camera 121b, the flash 124 may illuminate the subject.

As shown in FIG. 2(a), the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

As another example of such accessory, there is a cover configured to cover at least one face of the mobile terminal 100 or a pouch configured to receive at least one face of the mobile terminal 100. In particular, the cover or pouch can be configured to extend functions of the mobile terminal 100 by being linked to the display unit 151. In the following description, a flip type cover related to the present invention is explained in detail with reference to FIG. 3(a) and FIG. 3(b).

Figure 3A:
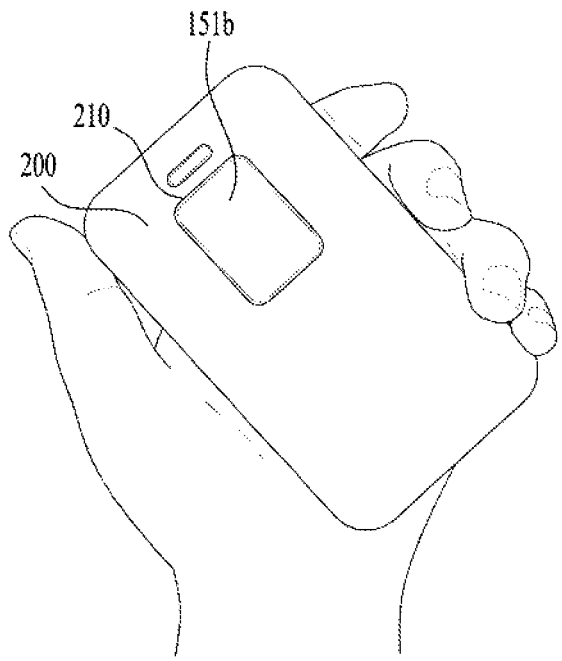
FIG. 3(a) and FIG. 3(b) are diagrams for one example of a cover installed on a mobile terminal according to one embodiment of the present invention.
Figure 3B:
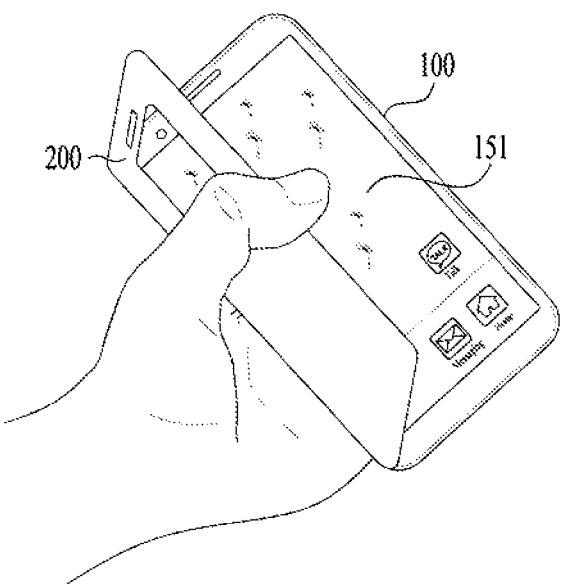

FIG. 3(a) and FIG. 3(b) are diagrams for one example of a cover installed on a mobile terminal according to one embodiment of the present invention.

FIG. 3(a) shows a state that a cover 200 of a flip type is closed. In this case, the cover 200 may be coupled with mobile terminal 100 in a manner of replacing the rear cover 103. Alternatively, the cover 200 may be coupled with the mobile terminal 100 in a manner of having a shape of a case configured to enclose the whole body except at least one portion of the front case 101 of the mobile terminal 100. An opening 210 is formed in a partial region of the cover 200. When the cover 200 is closed in a manner of being folded to overlap the touchscreen 151, a portion 151b of the touchscreen 151 can be exposed through the opening 210. For clarity of the following description, the region 151b of the touchscreen 151 exposed through the opening 210 of the cover 200 shall be named 'exposed region'.

Meanwhile, a magnet can be built in a prescribed region of the cover 200. And, a hole sensor is provided to a location of the mobile terminal 100 corresponding to the magnet built-in position of the cover 200 that is closed. Hence, the hole sensor can detect whether the cover 200 is open or closed. If the magnet and the hole sensor are not used, an open/closed state of the cover 200 can be detected through the proximity sensor 141 provided to the front face of the mobile terminal 100. While the closed state of the cover 200 is detected, if an event (e.g., a manipulation of the user input unit, a communication event of an incoming call, etc.) of turning on the touchscreen occurs, the controller 180 can control a user interface to be displayed in accordance with the corresponding event in a manner of corresponding to a size and location of the exposed region 151b. Moreover, if an open state of the cover 200 is detected, as shown in FIG. 3(b), the controller 180 can control the touchscreen 151 to be turned on.

A mobile terminal and controlling method thereof according to one embodiment of the present invention are provided. In particular, while a cover is in a closed state, a memo is composed through an exposed region exposed through an opening using the aforementioned mobile terminal and cover configuration. If the cover is opened, various functions can be performed using the composed memo.

Figure 4:
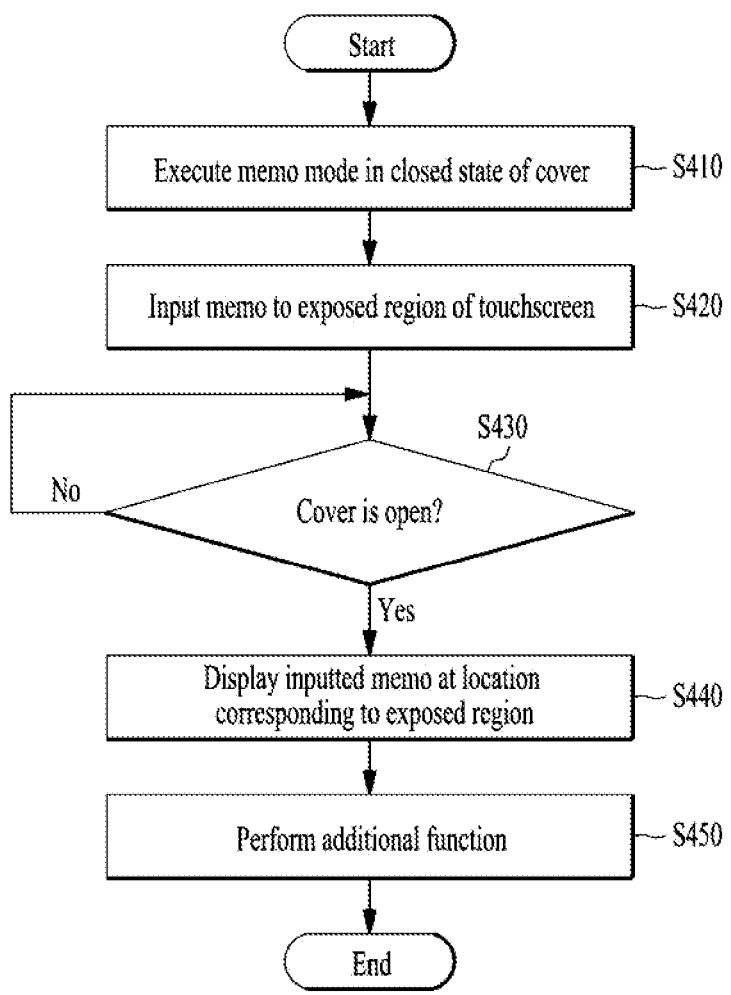
FIG. 4 is a flowchart of a process for composing and using a memo in a mobile terminal having a cover according to one embodiment of the present invention.

FIG. 4 is a flowchart of a process for composing and using a memo in a mobile terminal having a cover according to one embodiment of the present invention.

Referring to FIG. 4, while the cover 200 is closed, a memo mode can be executed [S410]. In this case, the memo mode means a mode for creating a display object of a prescribed type by visualizing a touch inputted to the exposed region 151b of the touchscreen 151 exposed through the opening 210. Moreover, the execution of the memo mode can be performed in case of a presence of a specific command input while the touchscreen is turned on in a closed state of the cover. The case of turning on the touchscreen in the closed state of the cover may include one of a communication event occurrence (e.g., an incoming call signal reception, a message reception, etc.), a preset alarm time arrival, a detection (e.g., an action of taking a stylus pen out of the mobile terminal, an open/closed state change of the cover, etc.) of a specific situation through a manipulation of the user input unit 123 or the sensing unit 140, and the like. And, the command, which is inputted to the turned-on touchscreen for the memo mode execution, may include one of a stylus pen taking-out action, a manipulation (e.g., an action of pressing or long-pressing at least one of the rear user input units 123c and 123d, etc.) of the user input unit, and the like. Of course, while the touchscreen is turned off, if one of the above-described commands is inputted, the memo mode can be executed in direct.

Once the memo mode is executed, a memo can be inputted onto the exposed region 151b [S420]. In doing so, the memo can be inputted in a manner of visualizing a trace of a touch input with a pointer. While the memo mode is executed, a screen used to be displayed prior to the execution of the memo mode can be displayed as a background screen on the exposed region 151b or a dedicated user interface for the memo mode or a preset background screen may be displayed on the exposed region 151b. Moreover, the termination of the memo mode can be performed in one of a case that a memo terminate menu displayed on the exposed region 151b is selected, a case that a memo is not inputted additionally over a prescribed time, a case that the user input unit 123 is manipulated in a specific form, and the like.

After the memo input has been completed, if an open state of the cover is detected [S430], the controller 180 turns on the touchscreen and is able to control the inputted memo to be displayed at a location corresponding to the exposed region [S440]. In this case, a configuration of the inputted memo may be identical to a configuration (e.g., a background state, a visual effect given to the memo, etc.) at that time of applying the corresponding input. Optionally, at least one portion of a configuration of the inputted memo may be different from a configuration at that time of applying the corresponding input [e.g., a memo displayed background is changed into a memo pad configuration]. Moreover, the displayed memo may be displayed differently in response to whether a lock function is set. For instance, if the lock function is set, a composed memo can be displayed on a lock screen. If the lock function is not set, a composed memo can be displayed on a home screen or a screen last displayed before an entry into a lock mode.

Thereafter, the controller 180 can control an additional function (e.g., a function of saving/editing/deleting the composed memo in response of a user's selection, a function of sharing the composed memo externally, a function of running another application using an information contained in the composed memo, etc.) to be performed [S450].

In the following description, a process for composing and utilizing a memo in memo mode according to the present invention is explained in detail with reference to the accompanying drawings.

FIG. 5(*a*) and FIG. 5(*b*) are diagrams for one example of a process for composing and displaying a memo in a mobile terminal according to one embodiment of the present invention.

Referring to FIG. 5(*a*), while a cover 200 is closed, a memo mode can be executed by one of the aforementioned methods. Once the memo mode is executed, a memo 510 can be composed along a trace of a touch with a pointer (e.g., a stylus pen 310, a finger 320, etc.) to an exposed region 151*b* exposed through an opening 210. If the composition of the memo is completed, a user can save the memo 510 by touching a save icon 520. If the memo saving is completed, a touchscreen may be turned off immediately or after a lapse of a prescribed time.

After the memo saving has been completed, if the cover 200 is opened, as shown in FIG. 5(*b*), the touchscreen 151 is turned on and the composed memo 510 can be displayed at a location corresponding to the exposed region 151*b* . According to the example shown in FIG. 5(*b*), the saved memo is displayed on a background of a memo pad type in a lock screen. And, it is a matter of course that the memo displayed background is diversely changeable. Meanwhile, if a delete icon 520 is selected, the composed memo is deleted so as not to be further displayed on the lock screen.

In the following description, a process for composing a memo in response to a communication event occurrence is explained in detail with reference to FIG. 6(*a*) and FIG. 6(*b*).

Figure 6A:
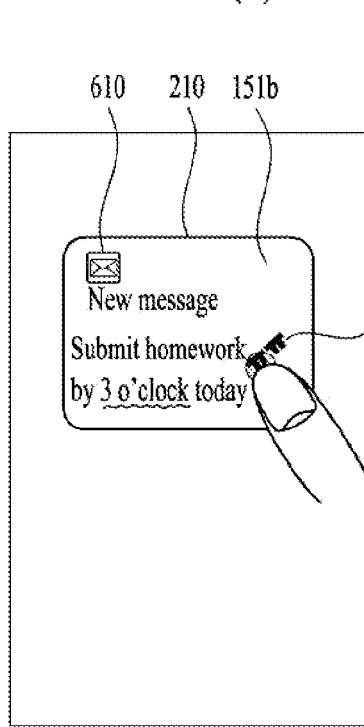
FIG. 6(a) and FIG. 6(b) are diagrams for one example of a process for composing and displaying a memo in response to an event occurrence in a mobile terminal according to one embodiment of the present invention.
Figure 6B:
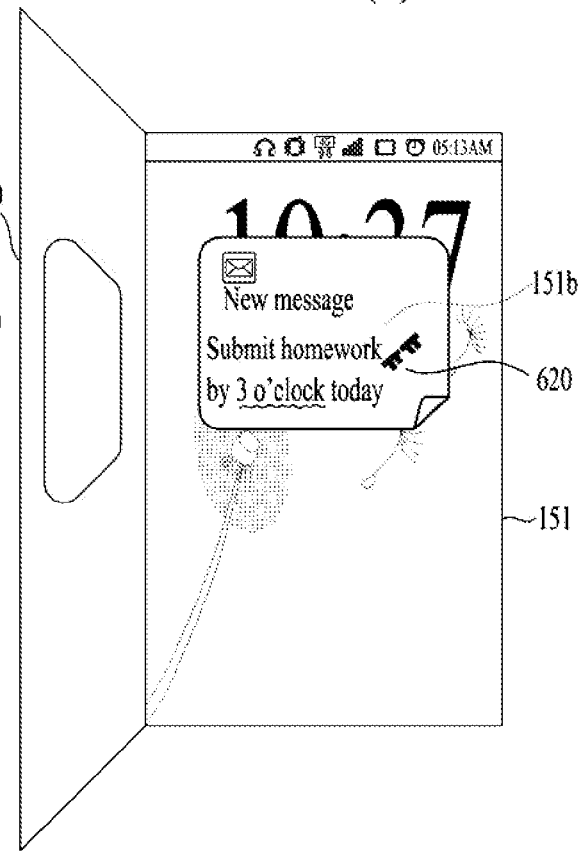

FIG. 6(*a*) and FIG. 6(*b*) are diagrams for one example of a process for composing and displaying a memo in response to an event occurrence in a mobile terminal according to one embodiment of the present invention.

Referring to FIG. 6(*a*), while a cover is closed, if a text message as a communication event arrives, a content of the text message is displayed on an exposed region 151*b* . In doing so, an icon 610 indicating a type of the communication event can be displayed as well. After a command for entering the aforementioned memo mode has been inputted, a user is able to compose a memo 620 with a pointer using the text message as a background.

Thereafter, if the cover 200 is opened, the memo 620, which is composed on a memo pad using the received text message as a background, can be displayed at a location corresponding to the exposed region 151*b* of the touchscreen 151.

Meanwhile, while the communication event related information shown in FIG. 6 is displayed on the exposed region, a content of the composed memo may be saved in association with a counterpart of the communication event. For instance, if a text message is currently displayed on the exposed region, the composed memo can be automatically displayed on a message input box in composing a message to send to a counterpart of the text message in the future.

Figure 7A:
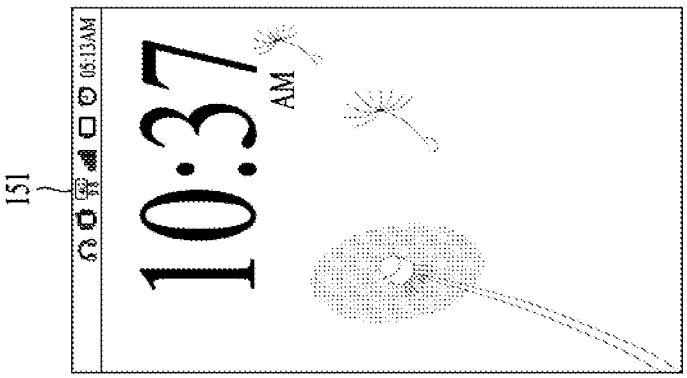
FIG. 7(a), FIG. 7(b) and FIG. 7(c) are diagrams for one example of a method of deleting a composed memo from a mobile terminal according to one embodiment of the present invention.
Figure 7B:
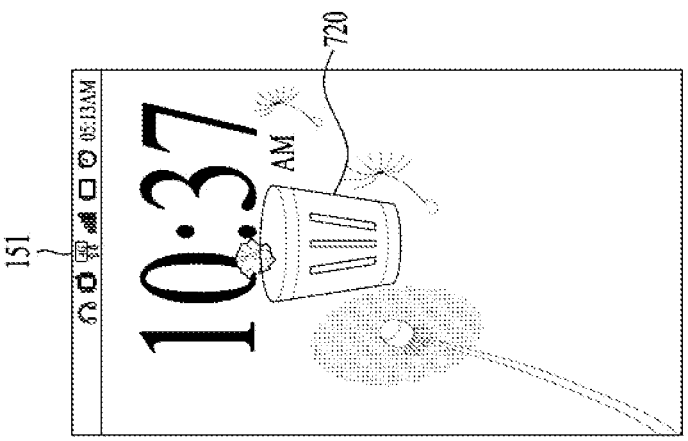
Figure 7C:
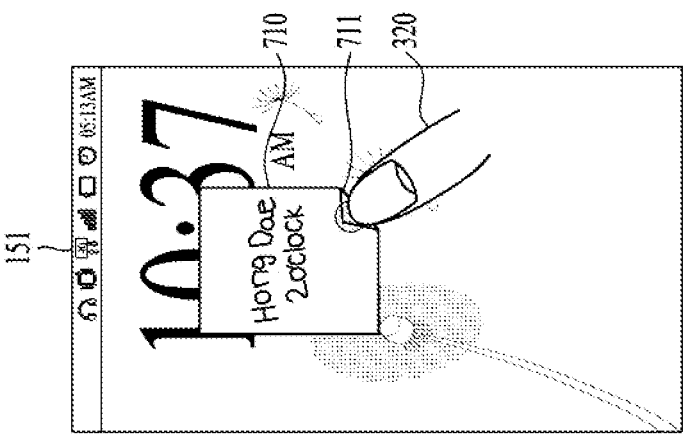

In the following description, a method of deleting a composed memo in case of opening a cover is described in detail with reference FIGS. 7(*a*) to 7(*c*) and a method of moving a composed memo to a specific region is explained in detail with reference to FIGS. 8(*a*) to 8(*c*).

FIG. 7(*a*), FIG. 7(*b*) and FIG. 7(*c*) are diagrams for one example of a method of deleting a composed memo from a mobile terminal according to one embodiment of the present invention.

Referring to FIG. 7(*a*), after a memo has been composed, as a cover is open, a memo 710 composed on a background of a memo pad type can be displayed at a location corresponding to an exposed region 151*b* of a touchscreen 151. In doing so, if a user drags a prescribed edge 711 of the memo pad with a pointer in a top direction, a visual effect of dumping a crumpled memo pad into a trash can 720 is outputted [FIG. 7(*b*)] and the memo 710 may then stop being further displayed [FIG. 7(*c*)]. This is inspired by a hand action of detaching a sticky memo pad. Hence, the user can delete the composed memo more intuitively and conveniently.

Figure 8A:
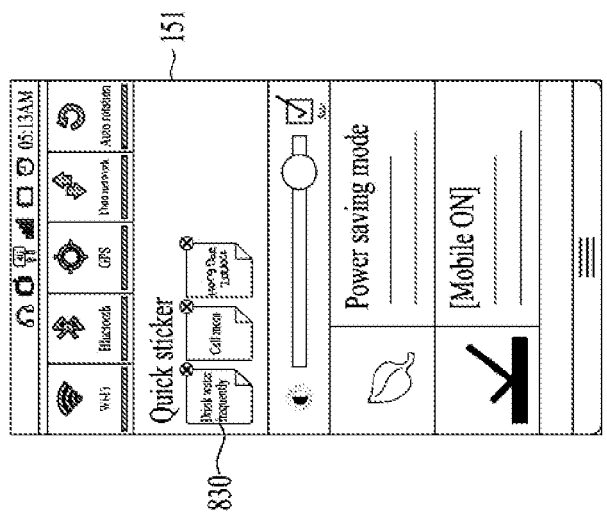
FIG. 8(a), FIG. 8(b) and FIG. 8(c) are diagrams for one example of a method of moving a composed memo to a specific region in a mobile terminal according to one embodiment of the present invention.
Figure 8B:
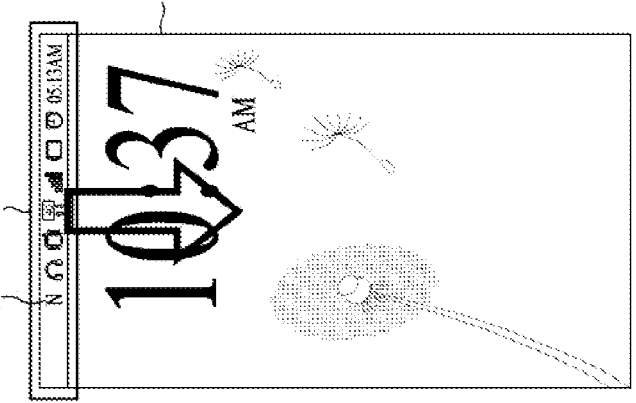
Figure 8C:
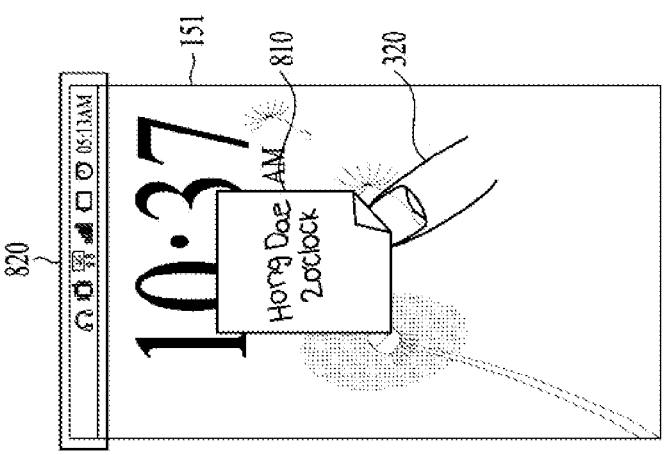

FIG. 8(*a*), FIG. 8(*b*) and FIG. 8(*c*) are diagrams for one example of a method of moving a composed memo to a specific region in a mobile terminal according to one embodiment of the present invention.

In FIG. 8(*a*), FIG. 8(*b*) and FIG. 8(*c*), a notification panel is assumed as a memo movable region. In this case, the notification panel means a layer displayed when an indicator region at one end portion of a touchscreen is dragged in a direction of the other end portion. In particular, icons for determining activation/deactivation of various functions by toggling and schematic informations on triggered events are generally displayed on the notification panel. And, the indicator region means a region on which indicators indicating various operation statuses of the mobile terminal are displayed.

Referring to FIG. 8(*a*), a memo 810 composed on a background of a memo pad type can be displayed at a location corresponding to an exposed region 151*b* of a touchscreen 151. In doing so, if a user drags the memo 810 with a pointer 320 to an indicator region 820 on a top end of the touchscreen 151, referring to FIG. 8(*b*), an indicator 821 indicating that the memo is added can be added to the indicator region 820. If the indicator region 820 is dragged in a bottom direction, referring to FIG. 8(*c*), a notification panel is displayed and the added memo 830 can be displayed within the notification panel. Through this, a user moves a memo to a frequently and quickly accessible region and is then able to conveniently check the moved memo.

In the following description, a cancellation of a lock screen and an execution of an additional function in accordance with a cover opening are explained in detail with reference to FIG. 9(*a*) and FIG. 9(*b*).

FIG. 9(*a*) and FIG. 9(*b*) are diagrams for one example of a process for performing an additional function using a composed memo in a mobile terminal according to one embodiment of the present invention.

Figure 9A:
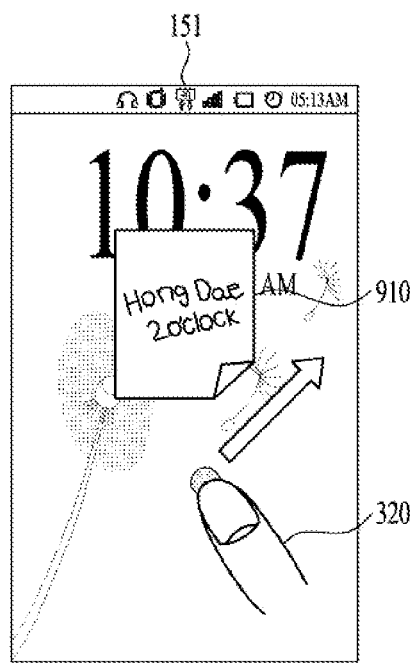
FIG. 9(a) and FIG. 9(b) are diagrams for one example of a process for performing an additional function using a composed memo in a mobile terminal according to one embodiment of the present invention.

FIG. 9(a), as a cover is open, a memo 910 composed on a background of a memo pad type can be displayed at a location corresponding to an exposed region 151b of a touchscreen 151. In doing so, if a lock screen function is set for the mobile terminal, as a cover is open, the memo 910 can be displayed on a lock screen. Then, a user is able to input a touch command of a preset pattern for a lock cancellation to the touchscreen 151. For instance, if the lock screen is set to be cancelled by an action of dragging a random region of the touchscreen 151 over a predetermined distance, like the example shown in FIG. 9(a), the user is able to cancel the lock screen in a manner of performing a touch-drag on a region of the touchscreen 151 except the region for displaying the memo 910 thereon, by which the present invention is non-limited. And, it is a matter of course that the present invention is applicable to various kinds of lock screen cancellation mechanisms.

Figure 9B:
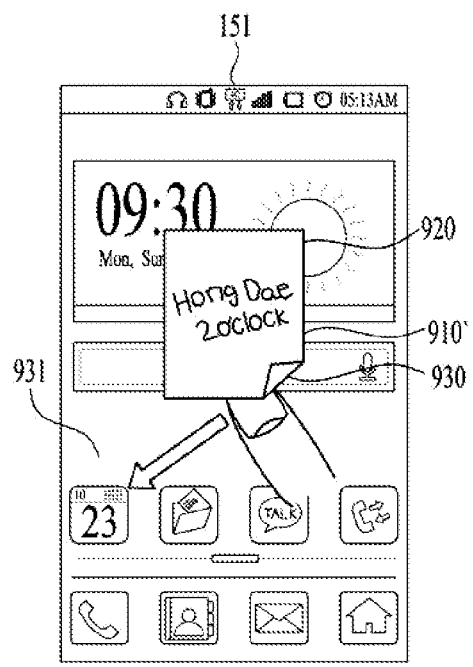

Hence, referring to FIG. 9(b), the lock screen is cancelled and a memo 910' in a configuration similar to a widget can be displayed on a wallpaper (e.g., a home screen). A tack icon 920 can be displayed on the memo 910' of the widget type. And, the memo 910' can be displayed in a manner that a prescribed corner 930 of the memo 910' is folded. If the tack icon 920 is selected, the corresponding memo 910' can be displayed in a manner of being fixed to a vacant region of the home screen or a currently displayed location. If the folded corner 930 is dragged in a prescribed direction, the corresponding memo 910' can be deleted in a manner similar to that shown in FIGS. 7(a) to 7(c).

Moreover, a size of the memo can be adjusted by a drag action performed in a manner of changing a distance between two touch points on the memo 910' [Pinch-in/out].

If the memo 910' is dragged to a specific icon 931 on the home screen, the controller 180 extracts an information included in the memo 910' (e.g., OCR, etc.) and is then able to run an application corresponding to the icon 931 using the extracted information. For instance, if a place and time are included in a memo content and an icon relates to a schedule management application, a new schedule according to the corresponding time and place can be automatically registered.

Meanwhile, if a home screen includes a plurality of pages, when a lock screen is cancelled, a first displayed page may include a page on which an icon corresponding to an application associated with information included in a memo exists. For instance, if content related to an address/place name is included in a memo, the controller 180 can control a home screen page, on which an icon corresponding to a map application, to be displayed as soon as the lock screen is cancelled. For another instance, if content related to a name/contact is included in a memo, the controller 180 can control a home screen page, on which an icon corresponding to a phonebook application, to be displayed as soon as the lock screen is cancelled.

FIG. 10(a), FIG. 10(b) and FIG. 10(c) are diagrams for another example of a process for performing an additional function using a composed memo in a mobile terminal according to one embodiment of the present invention.

Referring to FIG. 10(a), after memos have been composed plural times in a closed state of a cover, if the cover is opened, a plurality of the composed memos 1011, 1012 and 1013 composed in the closed state of the cover can be displayed together. In doing so, if a lock screen is cancelled, a plurality of the memos 1011' can be displayed in a manner of overlapping each other [FIG. 10(b)] or each of a plurality of the memos 1011', 1012' and 1013' can be separately displayed [FIG. 10(c)].

FIG. 11(a), FIG. 11(b), FIG. 11(c) and FIG. 11(d) are diagrams for further example of a process for performing an additional function using a composed memo in a mobile terminal according to one embodiment of the present invention.

In FIGS. 11(a) to 11(d), a following process is assumed as shown in FIG. 9 (b). First of all, after a memo has been composed, a cover is opened. Secondly, a lock screen is cancelled. Thirdly, a memo widget 910' of a memo pad is displayed on a home screen. On this assumption, if a user inputs a specific command (e.g., a manipulation of a rear user input unit, etc.), referring to FIG. 11(a), a state 1110 that a memo pad is folded is entered so that functions 1121 to 1125 linkable to informations included in a corresponding memo can be displayed nearby the folded memo pad.

Figure 11A:
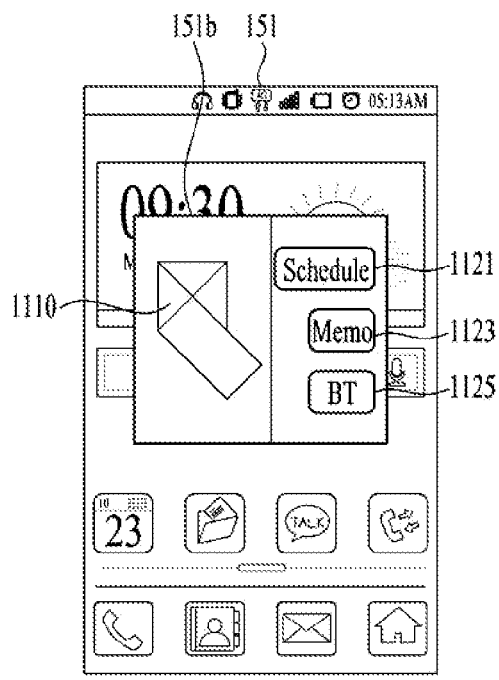
FIG. 11(a), FIG. 11(b), FIG. 11(c) and FIG. 11(d) are diagrams for further example of a process for performing an additional function using a composed memo in a mobile terminal according to one embodiment of the present invention.
Figure 11B:
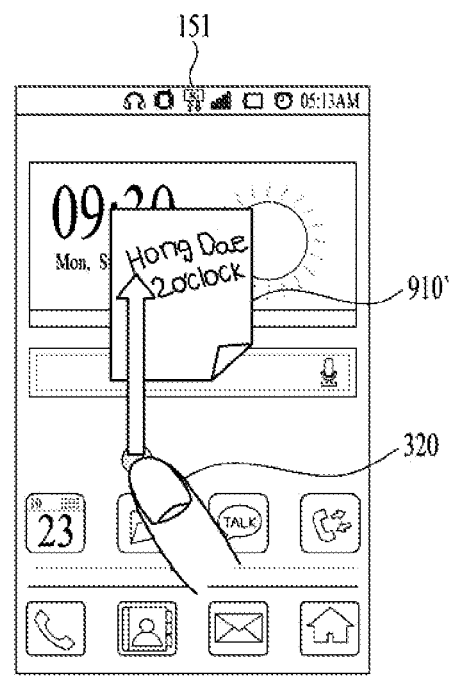
Figure 11C:
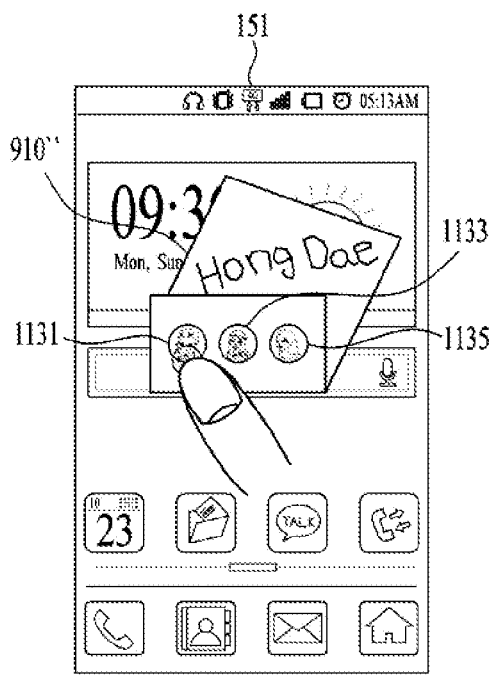

Alternatively, if a touch-drag command is inputted to the memo widget 910' with a pointer 320 in a top direction from a bottom direction as if folding the memo pad [FIG. 11(b)], a memo widget 910" of a folded memo pad type can be displayed [FIG. 11 (c)]. As the memo pad is folded to expose a backside of its own, icons 1131, 1133 and 1135 corresponding to contacts as shared targets can be displayed on the exposed backside. Although FIGS. 11(a) to 11(d) show the icons are assumed as corresponding to the contacts, icons corresponding not to contacts but to contact means (e.g., email, SMS, messenger, etc.) can be displayed. In this case, if an icon corresponding to a desired contact is selected, a composed memo can be sent to the selected contact. In doing so, a type of the sent memo may include a capture image of the type previously displayed on the touchscreen 151 or a text converted from information included in the memo.

Figure 11D:
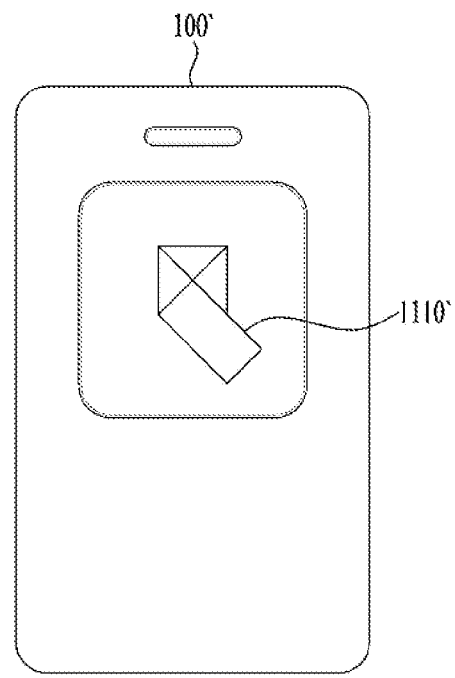

Meanwhile, the memo sent by the above-described method can be displayed as the folded memo pad shown in FIG. 11(d) on a touchscreen of a receiving side terminal 100'. Of course, the received memo can be displayed as the memo pad that is not folded.

FIG. 12(a), FIG. 12(b), FIG. 12(c) and FIG. 12(d) are diagrams for one example of a method of composing a memo of a specific type in a mobile terminal according to one embodiment of the present invention.

Figure 12A:
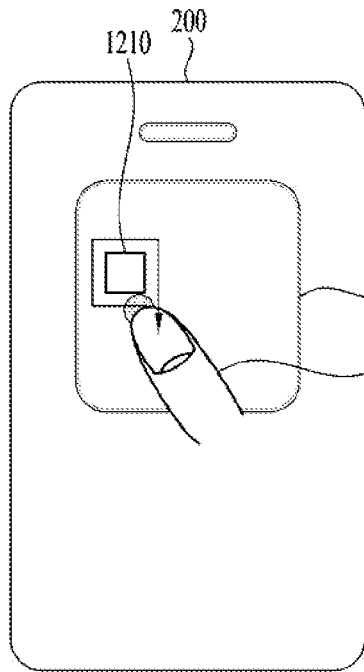
FIG. 12(a), FIG. 12(b), FIG. 12(c) and FIG. 12(d) are diagrams for one example of a method of composing a memo of a specific type in a mobile terminal according to one embodiment of the present invention.
Figure 12B:
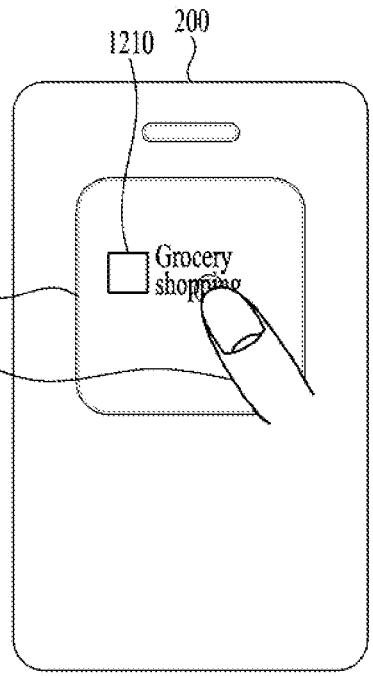
Figure 12C:
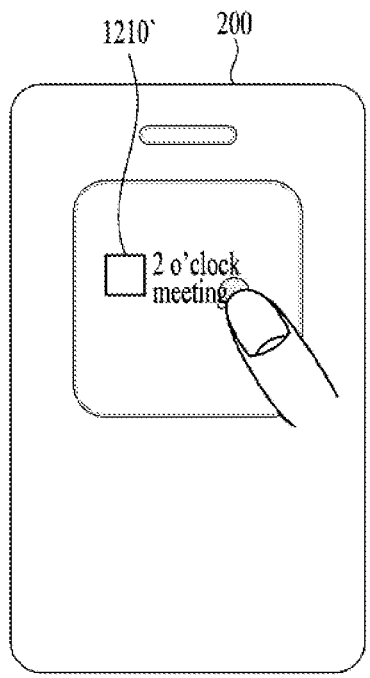
Figure 12D:
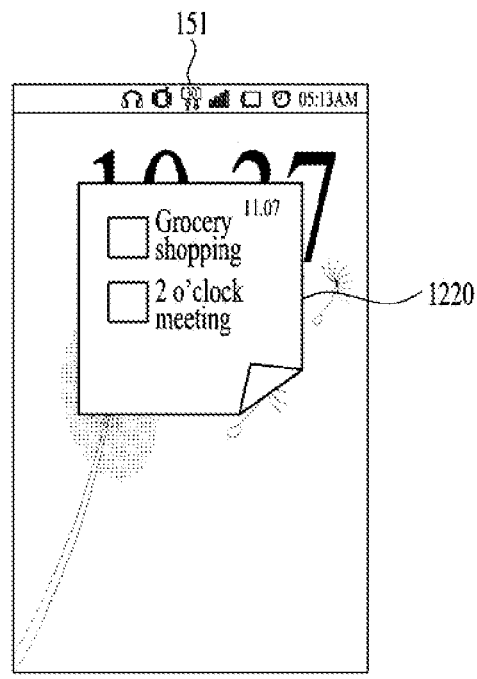

Referring to FIG. 12(a), after a memo mode has been executed in a closed state of a cover 200, if a user inputs a memo (e.g., a rectangle) to an exposed region 151b with a pointer 320, an indicator 1210 indicating a type of a to-do list can be created. Referring to FIG. 12(b), a memo inputted after the creation of the indicator 1210 can be saved as a memo of the to-do list type. Thereafter, after a memo mode has been executed, if another indicator 1210' is created and another memo is then inputted [FIG. 12(c)], a memo composed as the to-do list type can be displayed on a single memo pad 1220 together with the former memo [FIG. 12(d)].

In the following description, when a watch is displayed on an exposed region prior to an execution of a memo mode, a process for executing a memo mode is explained in detail with reference to FIGS. 13(a) to 15(d).

FIG. 13(a), FIG. 13(b), FIG. 13(c), FIG. 13(d), FIG. 14(a) and FIG. 14(b) are diagrams for one example of a process for performing a memo mode using a watch displayed on an exposed region in a mobile terminal according to one embodiment of the present invention.

Figure 13A:
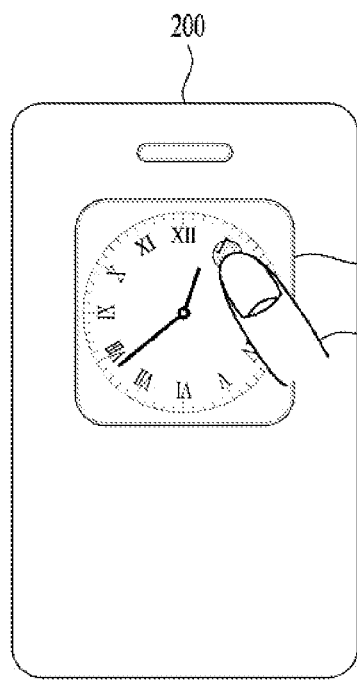
FIG. 13(a), FIG. 13(b), FIG. 13(c), FIG. 13(d), FIG. 14(a) and FIG. 14(b) are diagrams for one example of a process for performing a memo mode using a watch displayed on an exposed region in a mobile terminal according to one embodiment of the present invention.
Figure 13B:
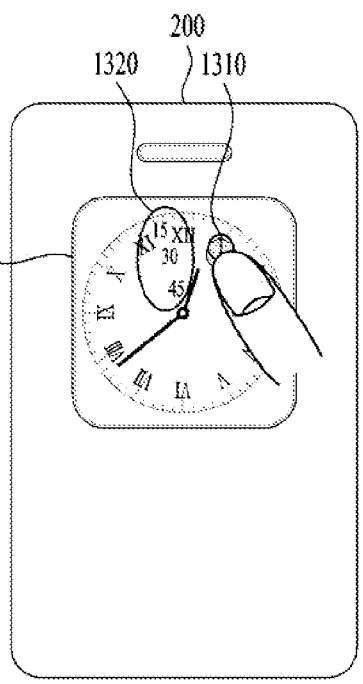
Figure 13C:
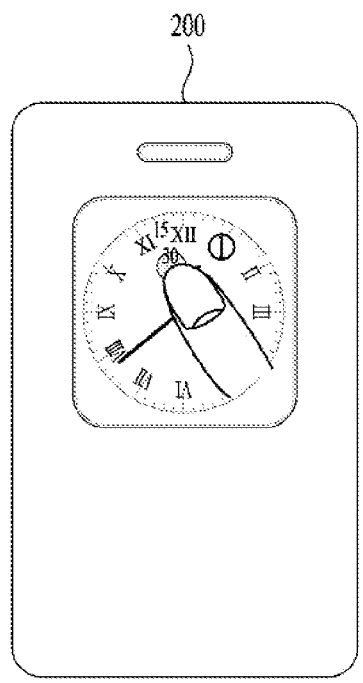
Figure 13D:
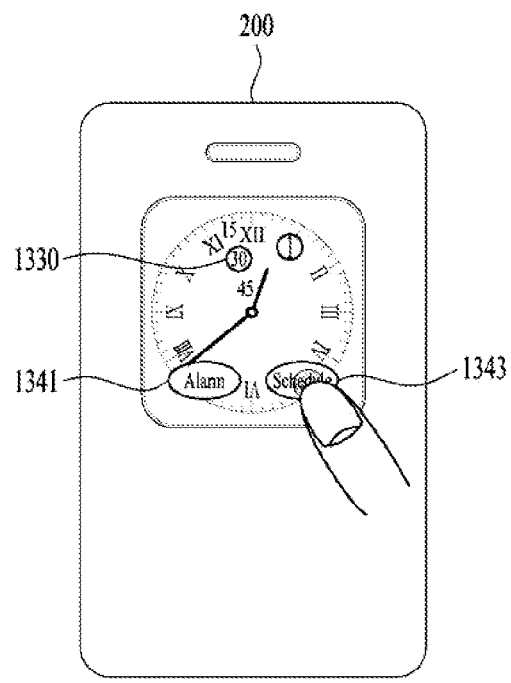
Figure 14A:
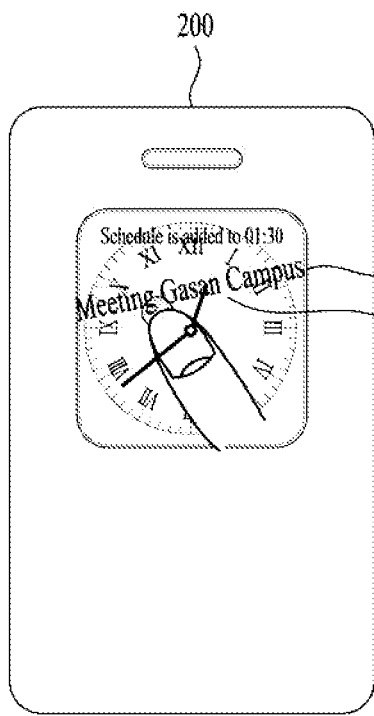
Figure 14B:
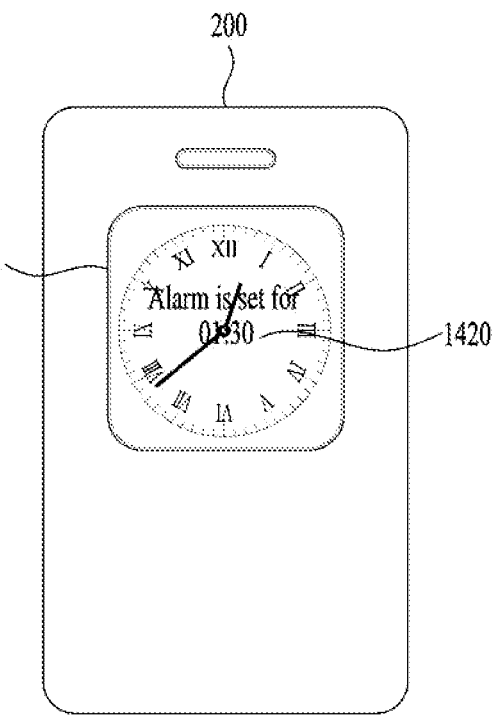
Figure 15A:
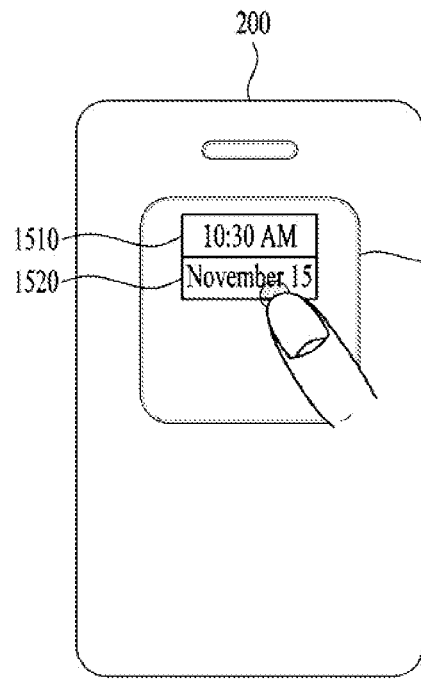
FIG. 15(a), FIG. 15(b), FIG. 15(c) and FIG. 15(d) are diagrams for another example of a process for performing a memo mode using a watch displayed on an exposed region in a mobile terminal according to one embodiment of the present invention.
Figure 15B:
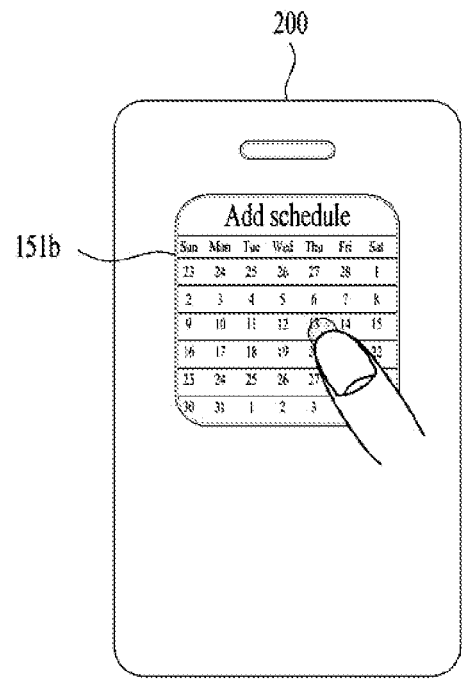
Figure 15C:
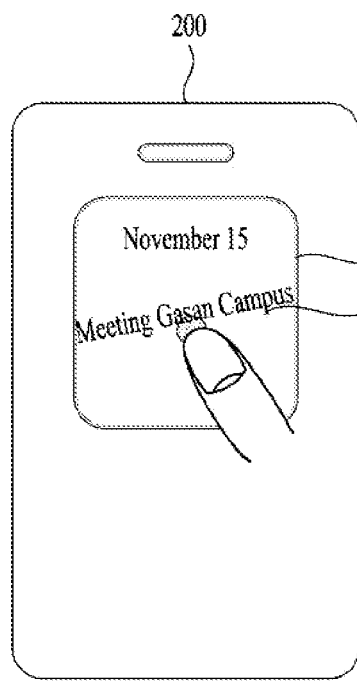
Figure 15D:
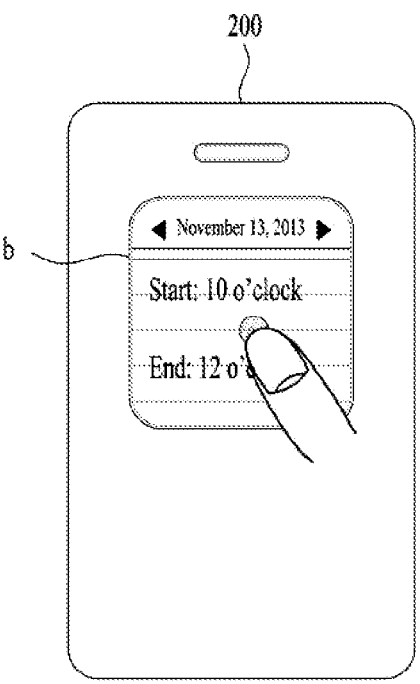

Referring to FIG. 13(a), an analog watch is currently displayed on an exposed region 151b . In this case, the analog watch can be displayed if a specific event (e.g., a manipulation of the user input unit right after closing the cover, a communication event occurrence, etc.) occurs in a closed state of a cover 200. In doing so, if a region corresponding to a specific time on the analog watch is touched (or long touched), referring to FIG. 13(*b*), a visual effect 1310 is displayed on the selected time and a menu 1320 for setting a detailed time slot to a unit of 15 minutes can be displayed as well. If a minute unit is selected from the menu 1320 [FIG. 13(*c*)], a visual effect 1330 can be given to the minute-unit time slot [FIG. 13(*d*)]. As the time selection is completed, menus 1341 and 1343 executable in association with the selected time can be displayed on a bottom end of the exposed region 151*b*.

Alternatively, the selection of the time slot in FIGS. 13(*a*) to 13(*d*) may be applied after inputting a command for entering a memo mode. And, the minute-unit selection is exemplarily set for the unit of 15 minutes. Moreover, it is apparent to those skilled in the art that the selection of the time slot can be set for various unit time slots.

If the schedule menu 1343 is selected in FIG. 13(*d*), a memo 1410 corresponding to a content of a schedule can be inputted using the analog watch as a background [FIG. 14(*a*)]. If the alarm menu 1341 is selected in FIG. 13(*d*), an alarm is set for a selected time and a message 1420 indicating the alarm setting can be displayed as well.

A case of a digital watch is described in detail with reference to FIGS. 15(*a*) to 15(*d*) as follows.

FIG. 15(*a*), FIG. 15(*b*), FIG. 15(*c*) and FIG. 15(*d*) are diagrams for another example of a process for performing a memo mode using a watch displayed on an exposed region in a mobile terminal according to one embodiment of the present invention.

Referring to FIG. 15(*a*), a digital watch representing both a time 1510 and a date 1520 is displayed on an exposed region 151*b* instead of an analog watch. In doing so, if a region for displaying the date 1520 is selected by a touch input with a pointer, referring to FIG. 15(*b*), a calendar of a month unit can be displayed. If a selection of a date from the calendar is completed, referring to FIG. 15(*c*), a content 1530 of a schedule can be inputted by the aforementioned memo input method. Hence, the controller 180 can set a schedule item using information included in a memo on the selected date.

In the situation shown in FIG. 15(*a*), if a region for displaying the time 1510 is selected by a touch input with a pointer, referring to FIG. 15(*d*), a schedule table of today by time unit can be displayed. After a user has selected a time slot corresponding to a desired schedule, it is a matter of course that the user can input a content of the schedule as a memo in the manner similar to that shown in FIG. 15(*c*).

It will be apparent to those skilled in the art that various modifications and variations can be specified into other form(s) without departing from the spirit or scope of the inventions.

According to one embodiment of the present invention, the above-described methods can be implemented in a program recorded medium as computer-readable codes. The computer-readable media include all kinds of recording devices in which data readable by a computer are saved. The computer-readable media include ROM, RAM, CD-ROM, magnetic tapes, floppy discs, optical data storage devices, and the like for example and also include carrier-wave type implementations (e.g., transmission via Internet). And, the computer may include the controller 180 of the terminal The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a touchscreen;
    a cover located relative to the touchscreen and being positionable between open and closed positions, wherein the cover is shaped to define an opening, wherein when the cover is in the closed position, a first portion of the touchscreen is obscured while a second portion of the touchscreen is exposed via the opening of the cover, and wherein when the cover is in the open position, an entire portion of the touchscreen is exposed; and
    a sensor configured to detect whether the cover is in the open position or in the closed position; and
    a controller configured to:
        cause the touchscreen to display a screen for receiving a memo input while the cover is in the closed position to permit the memo input via the second portion of the touchscreen while the cover is in the closed position;
        obtain information from the memo input received via the screen; and
        cause the touchscreen to display the memo input in response to the cover being positioned from the closed position to the open position, the memo input displayed on one of a plurality of pages of a home screen that is displayed when the cover is in the open position, based on the obtained information, such that the one of the plurality of pages includes an application related to the memo input.

2. The mobile terminal of claim 1, wherein the controller is further configured to cause the touchscreen to:
    display a visual effect according to a touch trace of a pointer causing the memo input.

3. The mobile terminal of claim 1, wherein:
    each of the plurality of pages includes at least one application; and
    pages among the plurality of pages other than the one of the plurality of pages are not displayed when the memo input is displayed on the one of the plurality of pages.

4. The mobile terminal of claim 3, wherein
    the one of the plurality of pages includes an icon corresponding to the application related to the memo input.

5. The mobile terminal of claim 4, wherein the controller is further configured to:
    execute the application related to the memo input in response to dragging of the displayed memo input to the icon.

6. The mobile terminal of claim 5, wherein:
    the application comprises a map application and the obtained information comprises an address or a name of a place; or
    the application comprises a phonebook application and the obtained information comprises a name or contact.

7. The mobile terminal of claim 1, further comprising a wireless communication unit, wherein the controller is further configured to cause the wireless communication unit to transmit the memo input externally.

8. The mobile terminal of claim 1, wherein the displayed memo input includes an image that was displayed on the second portion prior to the displaying of the screen for memo input as a background image.

9. The mobile terminal of claim 1, further comprising a user input unit, a wireless communication unit, and a pointer, wherein the controller is further configured to cause the displaying of the screen for memo input in response to an input applied via the user input unit, an occurrence of a communication event received via the wireless communication unit, or ejection of the pointer out of the mobile terminal.

10. A method of controlling a mobile terminal comprising a touchscreen and a cover located relative to the touchscreen and being positionable between open and closed positions, wherein the cover is shaped to define an opening, wherein when the cover is in the closed position, a first portion of the touchscreen is obscured while a second portion of the touchscreen is exposed via the opening of the cover, and wherein when the cover is in the open position, an entire portion of the touchscreen is exposed, the method comprising:
detecting whether the cover is in the open position or in the closed position;
displaying a screen for receiving a memo input while the cover is in the closed position to permit the memo input via the second portion of the touchscreen while the cover is in the closed position;
obtaining information from the memo input received via the screen; and
displaying the memo input in response to the cover being positioned from the closed position to the open position, the memo input displayed on one of a plurality of pages of a home screen that is displayed when the cover is in the open position, based on the obtained information, such that the one of the plurality of pages includes an application related to the memo input.

11. The method of claim 10, further comprising:
displaying a visual effect according to a touch trace of a pointer causing the memo input.

12. The method of claim 10, wherein:
each of the plurality of pages includes at least one application; and
pages among the plurality of pages other than the one of the plurality of pages are not displayed when the memo input is displayed on the one of the plurality of pages.

13. The method of claim 12, wherein
the one of the plurality of pages includes an icon corresponding to the application related to the memo input.

14. The method of claim 13, further comprising:
executing the application related to the memo input in response to dragging of the displayed memo input to the icon.

15. The method of claim 10, further comprising transmitting the memo input externally.

16. The method of claim 10, wherein the displayed memo input includes an image that was displayed on the second portion prior to the displaying of the screen for memo input as a background image.

17. The method of claim 10, wherein the screen for memo input is displayed in response to an input applied via a user input unit, an occurrence of a communication event received via a wireless communication unit, or ejection of a pointer out of the mobile terminal.

18. A mobile terminal comprising:
a touchscreen;
a cover located relative to the touchscreen and being positionable between open and closed positions, wherein the cover is shaped to define an opening, wherein when the cover is in the closed position, a first portion of the touchscreen is obscured while a second portion of the touchscreen is exposed via the opening of the cover, and wherein when the cover is in the open position, an entire portion of the touchscreen is exposed; and
a controller configured to:
cause the touchscreen to display a screen for receiving a memo input in response to an input received while the cover is in the closed position such that the memo input is received on the second portion of the touchscreen via a pointer that is in contact with the second portion through the opening;
cause storing of the memo input in association with first information that was displayed on the second portion prior to the displaying of the screen for memo input;
obtain second information from the received memo input; and
cause the touchscreen to display the memo input in response to the cover being positioned from the closed position to the open position, the memo input displayed on one of a plurality of pages of a home screen that is displayed when the cover is in the open position, based on the second information, such that the one of the plurality of pages includes an application related to the memo input.

19. The mobile terminal of claim 18, wherein:
the first information comprises time information; and
the memo input is stored as schedule information in association with the time information.

20. The mobile terminal of claim 19, wherein while the cover is in the closed position, the controller is further configured to:
cause the touchscreen to display the time information on the second portion;
cause the touchscreen to display a plurality of time units in response to a first input applied on the second portion displaying the time information;
cause storing of the memo input as the schedule information in response to a second input for selecting one of the plurality of time units such that the stored memo input is associated with the selected one of the plurality of time units; and
cause storing of the memo input as the schedule information according to a type selected in response to a third input applied on the second portion displaying the time information, the type comprising an alarm or a schedule.

21. The mobile terminal of claim 18, wherein:
the first information comprises information related to a communication event; and
the memo input is stored in association with another terminal from which the communication event originated.

* * * * *